United States Patent [19]
Van As et al.

[11] Patent Number: 5,214,649
[45] Date of Patent: May 25, 1993

[54] INSERT/REMOVE SIGNALLING IN LAN SYSTEMS

[75] Inventors: Harmen Van As, Langnau; Wolfram Lemppenau, Kilchberg; Erwin Zurfluh, Feldmeilen, all of Switzerland

[73] Assignee: International Business Machines Corporation, Armonk, N.Y.

[21] Appl. No.: 716,575

[22] Filed: Jun. 17, 1991

[30] Foreign Application Priority Data

Mar. 27, 1991 [EP] European Pat. Off. ........ 91810222.9

[51] Int. Cl.⁵ ............................ H04J 3/16; H04J 3/12
[52] U.S. Cl. ................................ 370/110.1; 370/85.7; 370/85.15
[58] Field of Search ...................... 370/85.7, 85.15, 82, 370/99, 94.1, 110.1, 111

[56] References Cited

U.S. PATENT DOCUMENTS

| | | | |
|---|---|---|---|
| 4,416,008 | 11/1983 | Takahashi et al. | 370/88 |
| 4,637,014 | 1/1987 | Bell et al. | 370/85.7 |
| 4,694,453 | 9/1987 | Kobayashi et al. | 370/85.7 |
| 4,726,017 | 2/1988 | Krum et al. | 370/85 |

FOREIGN PATENT DOCUMENTS

| | | |
|---|---|---|
| 0393293 | 4/1989 | European Pat. Off. |
| 2162722 | 7/1985 | United Kingdom |
| 9100662 | 1/1991 | World Int. Prop. O. |

Primary Examiner—Douglas W. Olms
Assistant Examiner—Min Jung
Attorney, Agent, or Firm—Joscelyn G. Cockburn

[57] ABSTRACT

In a communication system comprising several nodes and a scheduler interconnected by a serial transmission medium, signalling information is transmitted by inserting it whenever required in the data stream in the form of basic data units (ADU). The scheduler inserts a request start and an end flag, and any node requiring allocation of a given type of service insert its request unit between the flags. Thus, the scheduler receives accumulated node-individual request information. The scheduler then sends a response comprising individual response units between two delimiting flags. Each node having made a request removes the respective individual response unit so that only the flags return to the scheduler. Special pipelined circuitry allows insertion and removel of the basic data units constituting the signalling information at very high speed without impeding the speed and timing of the passing data stream.

9 Claims, 10 Drawing Sheets

RESERVATION

CONFIRMATION

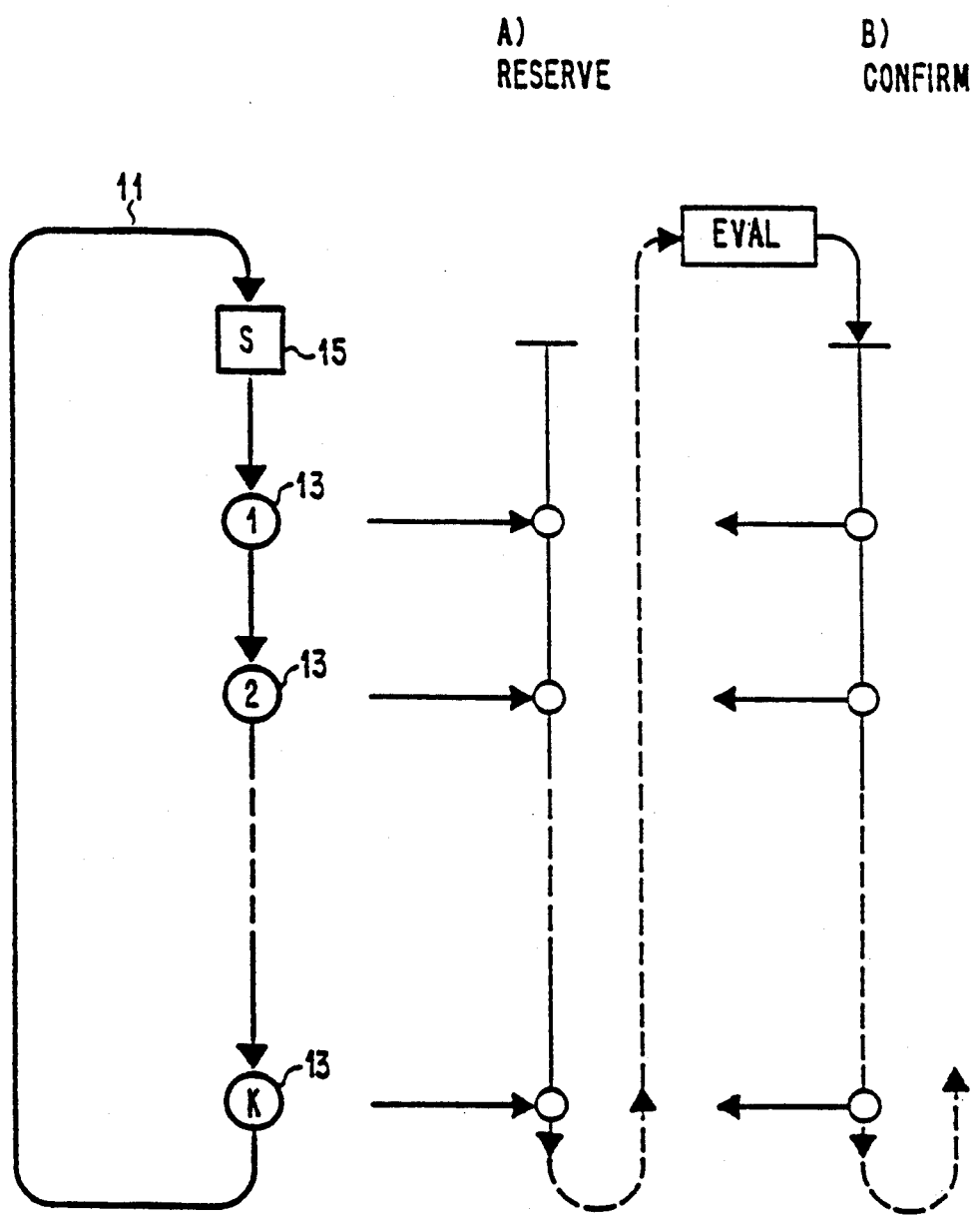
FIG. 1 NETWORK STRUCTURE AND
RESERVE / CONFIRM PROCEDURE

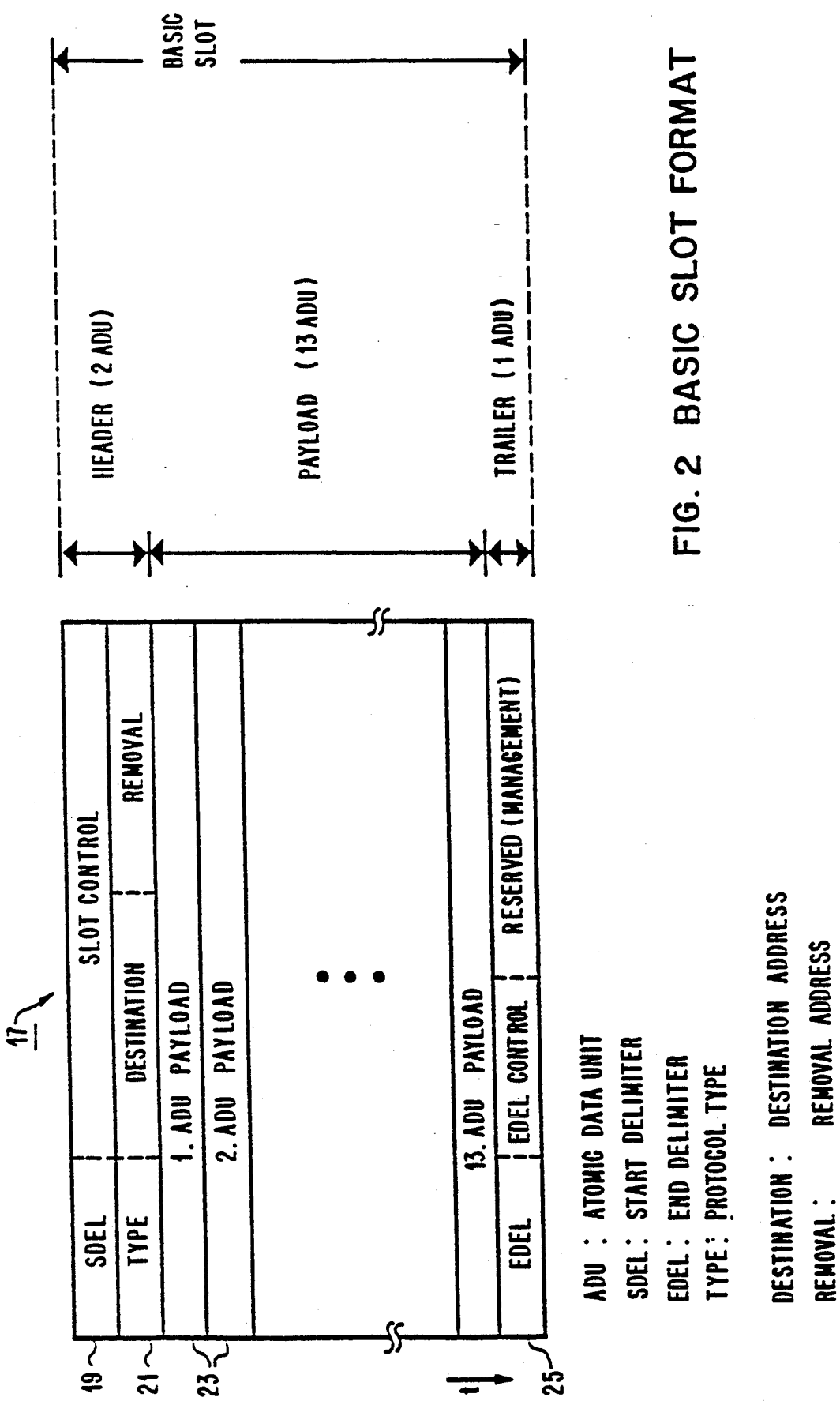
FIG. 2 BASIC SLOT FORMAT

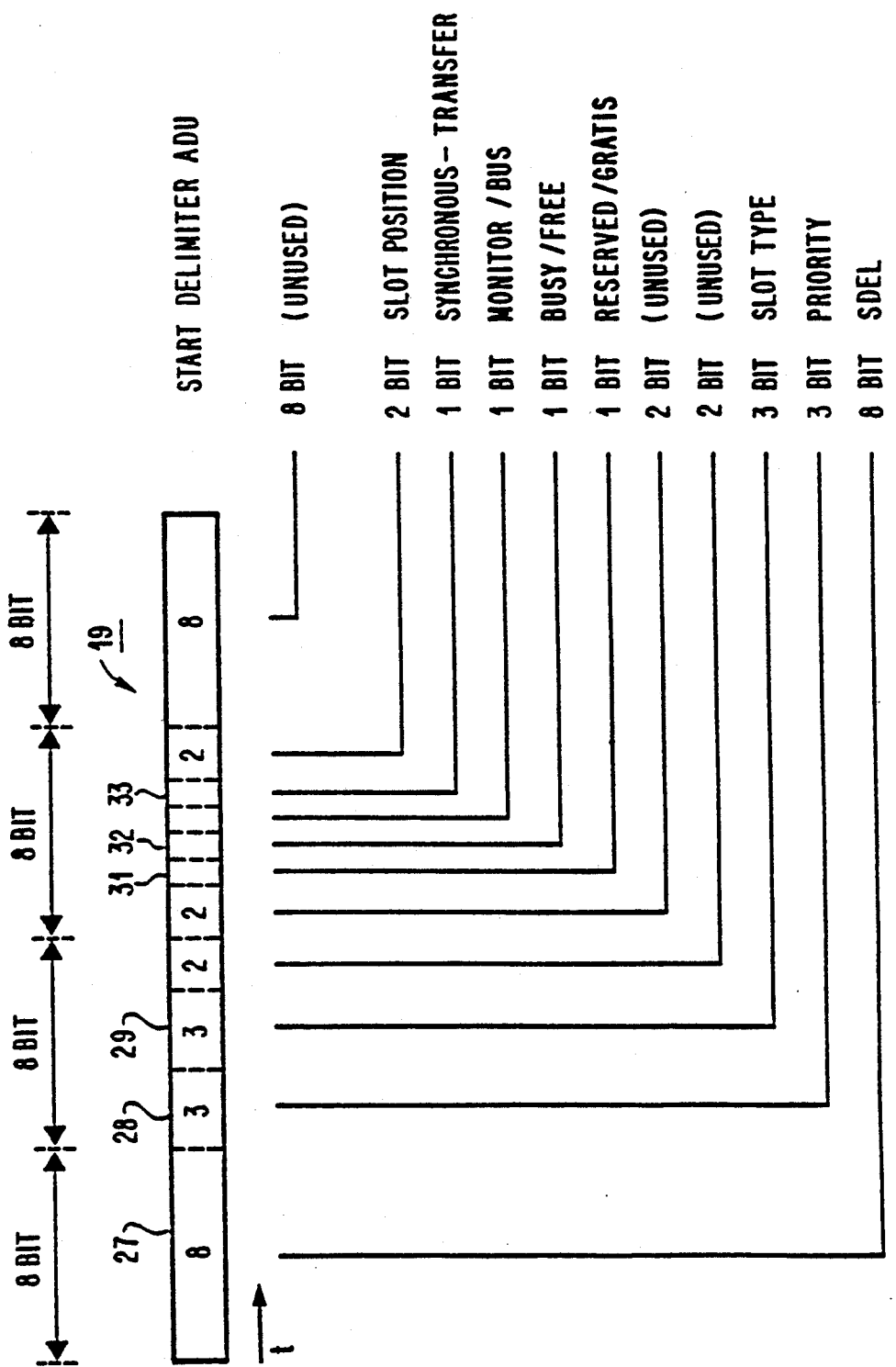
FIG. 3 DETAILS OF SLOT HEADER (START DELIMITER/CONTROL FIELD)

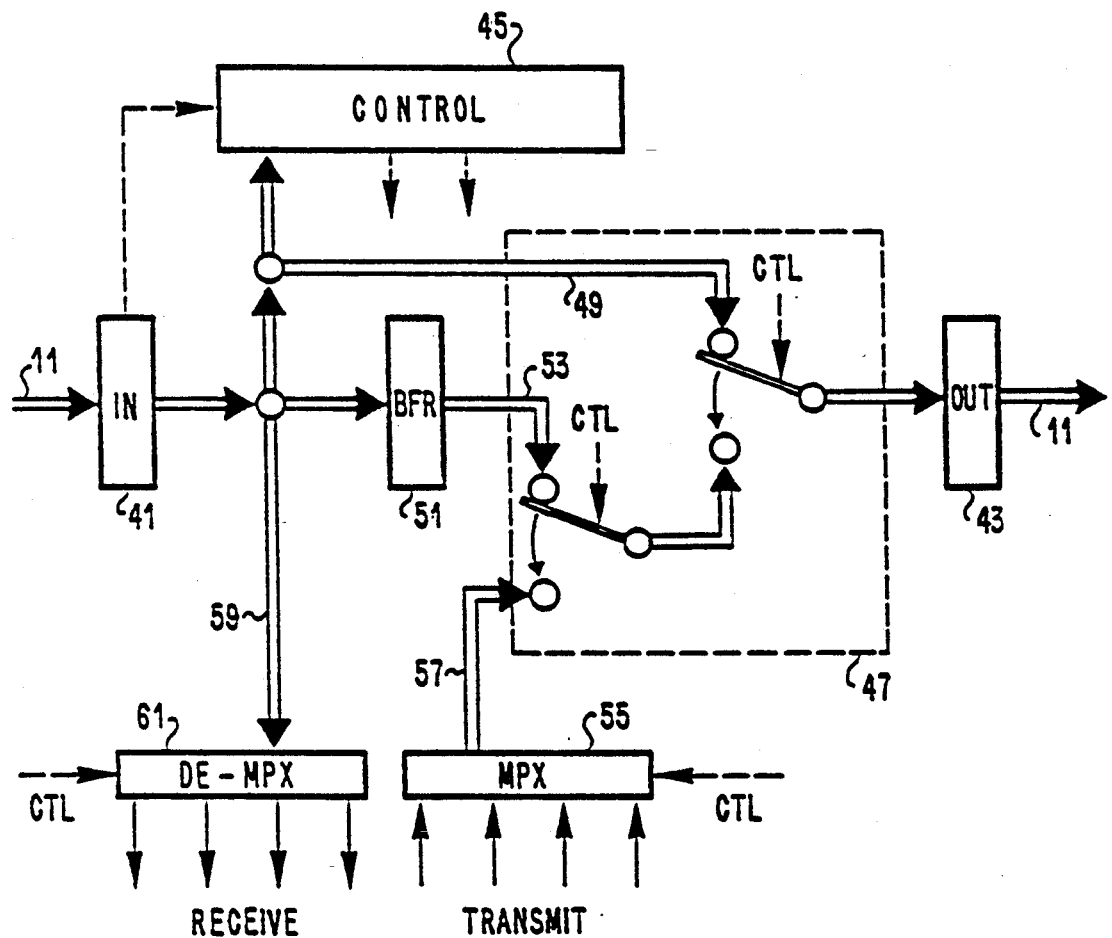
FIG. 4 NODE STRUCTURE

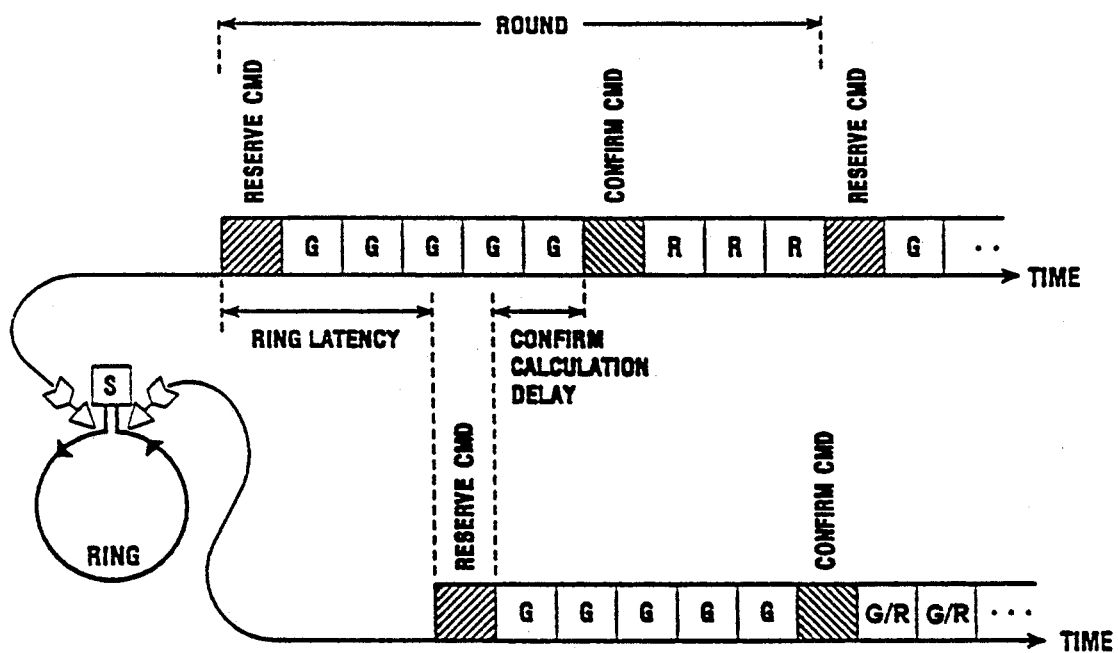
FIG. 5 CONCEPT OF ROUND

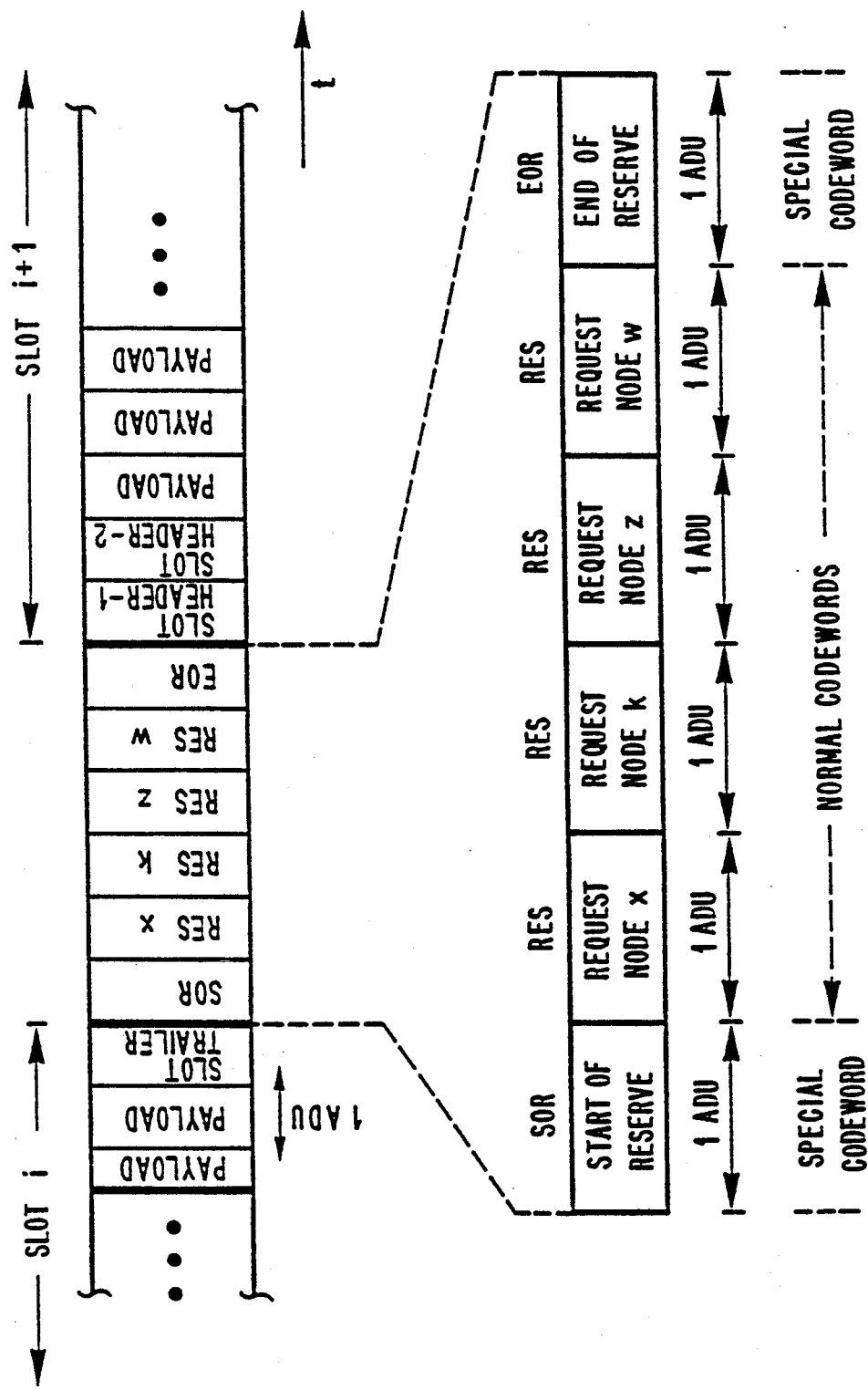
FIG. 6 INSERT SIGNALLING FOR RESERVE COMMAND

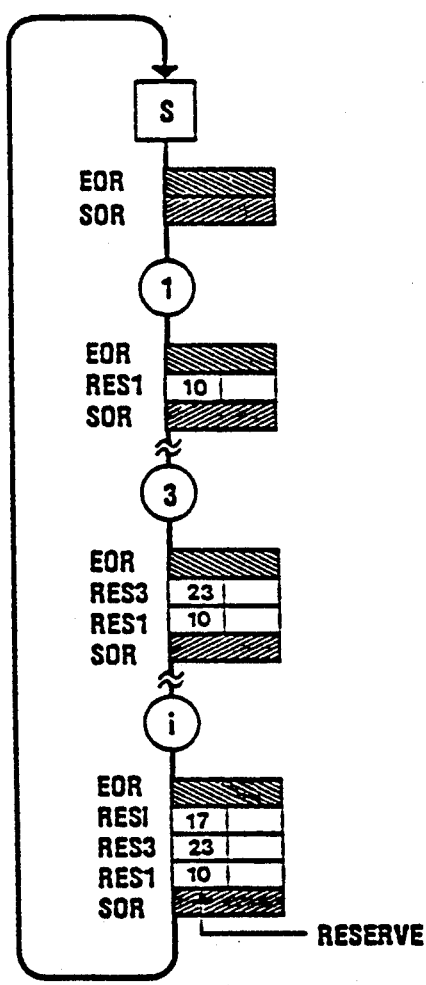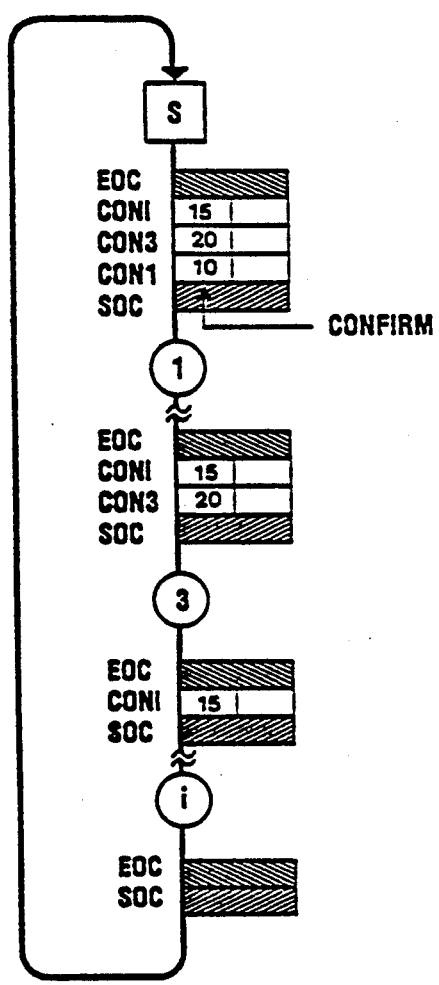
FIG. 7 CIRCULATION OF RESERVE AND CONFIRM COMMAND (INSERT / REMOVE)

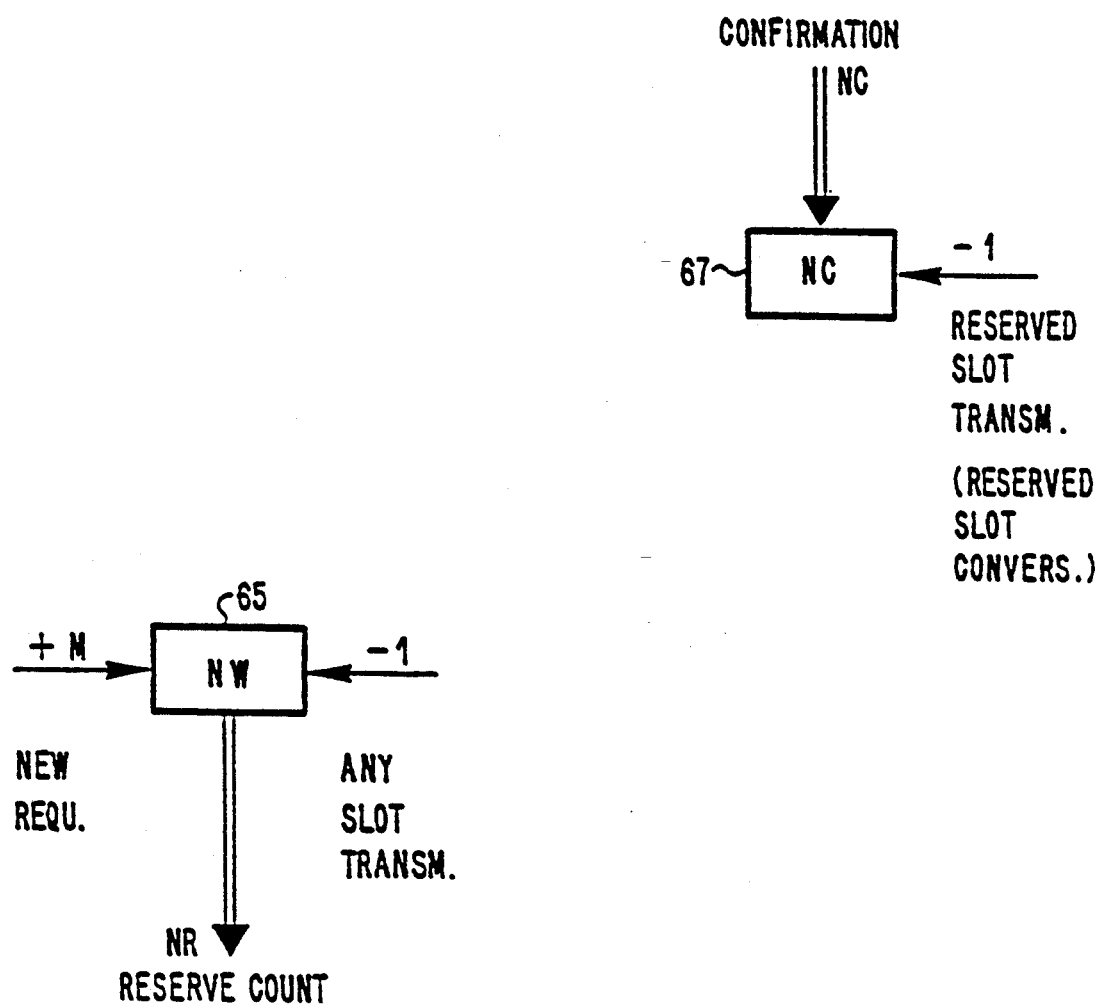
FIG. 8 SLOT COUNTERS IN NODES

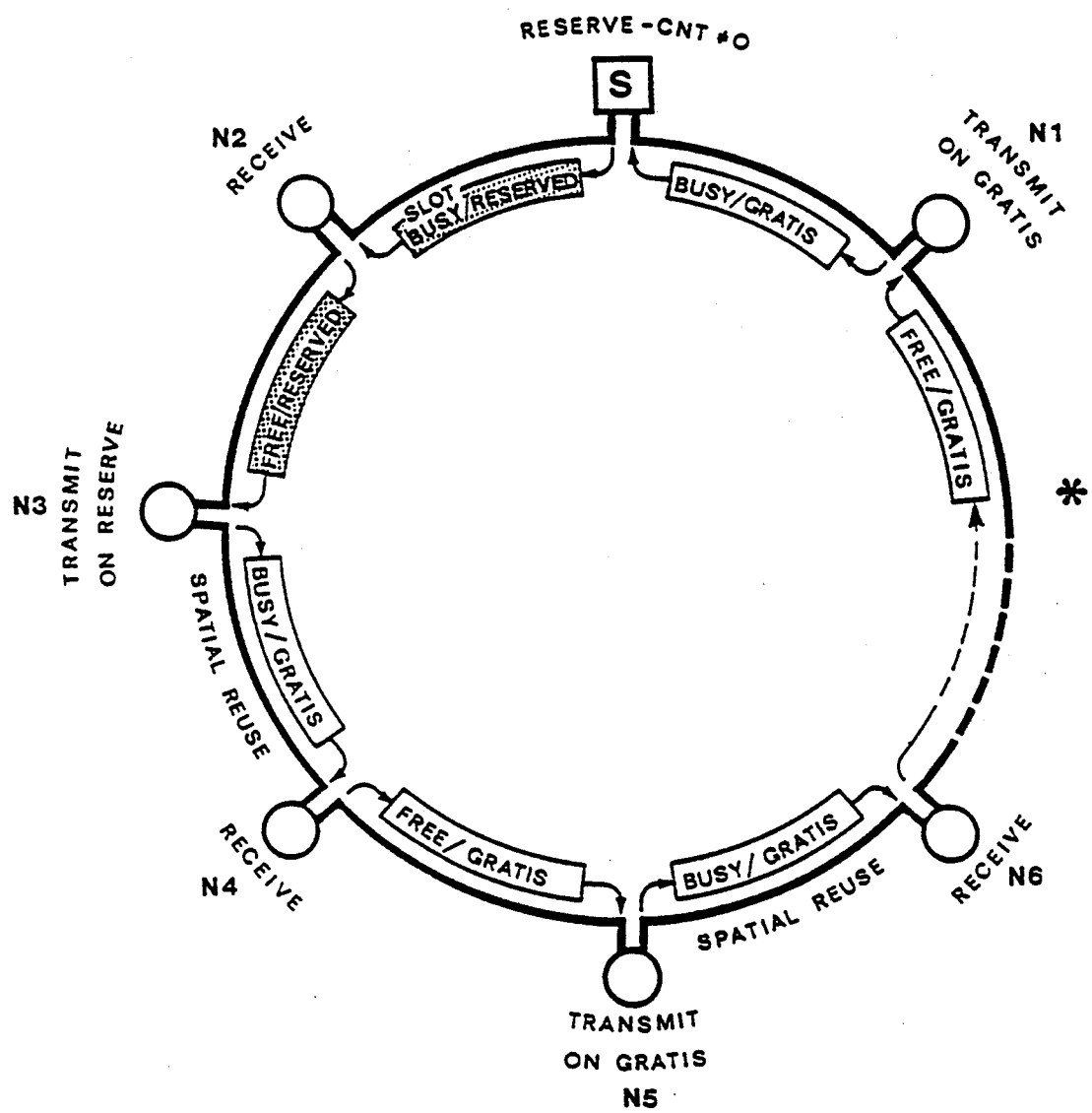
FIG. 9 CIRCULATION OF SLOT

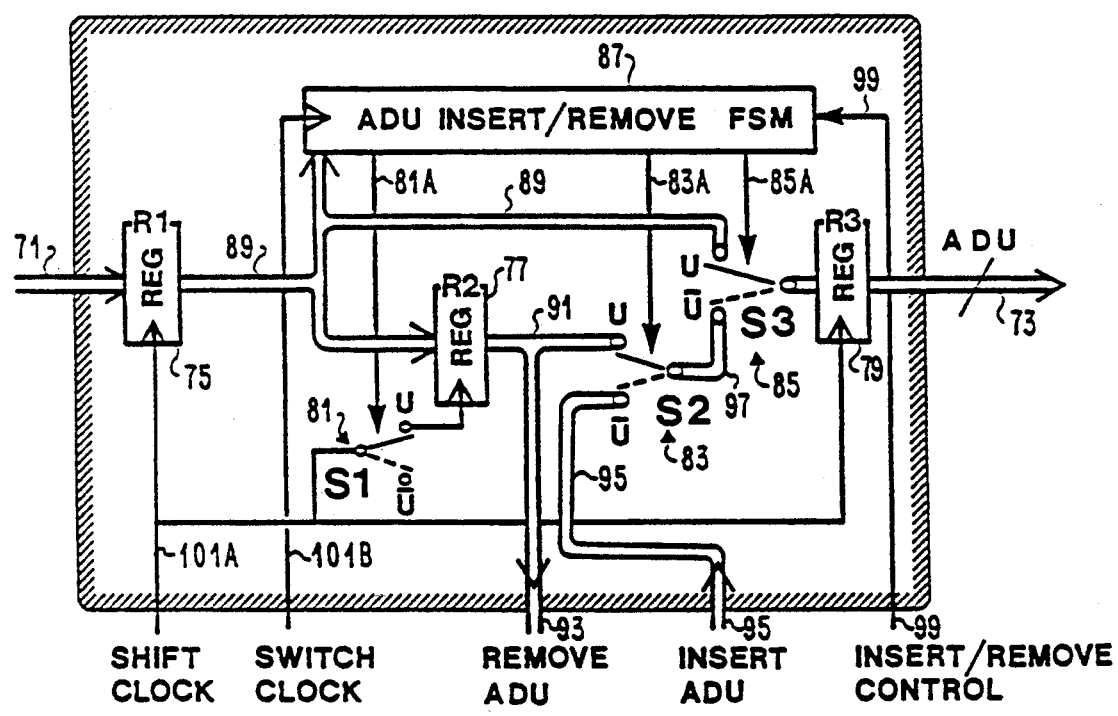
FIG. 10 CLOCKING OF PIPELINED OPERATIONS

INSERT/REMOVE SIGNALLING IN LAN SYSTEMS

DESCRIPTION

Present invention is concerned with signalling in local area communication systems where several nodes and a scheduler are interconnected by a serial transmission medium. In particular, the invention covers the transfer of service demand and service allocation information between the scheduler and any of the nodes in the network.

Numerous systems are known in which a plurality of stations are interconnected by a transmission ring or a dual-bus or folded bus network. Examples of such systems are described e.g. in the following:

U.S. Pat. No. 4,002,842 entitled "Time Multiplex Loop Telecommunication System" discloses a ring communication system in which several nodes are interconnected by a transmission ring, and data can be transmitted in packets by a buffer-insertion technique. If, during a local packet transmission, another packet arrives on the ring, it is delayed in a buffer. The buffer can later be emptied when the own packet returns to the sender.

A similar system is described in an article by D. E. Huber et a. entitled "SILK: An Implementation of a Buffer Insertion Ring". For signalling (e.g. connection establishment) particular packets must be exchanged.

In European patent application EP-A-0'393 293 entitled "Method and Apparatus for Cyclic Reservation Multiple Access in a Communication System" a dual-bus or folded-bus network is disclosed in which data are transmitted in slots. Access to such slots must be requested and acknowledged in advance by a special signalling procedure. For signalling, each slot carries a special control field, and the control field of several slots must be used for transmitting a request command. Furthermore, nodes must process the contents of the control field during transmission if they want to enter a request.

European patent application No. 90810456.5 (IBM) entitled "Broadband Ring Communication System and Access Control Method" describes a ring communication system in which information is transmitted in frames each comprising a number of consecutive slots. One slot of each frame is reserved for signalling information. The system provides buffer insertion technique for asynchronous data, but immediate transfer in each node for the signalling information and for isochronous information.

In these systems, it is necessary to use several packets or slots for conveying signalling information between a number of nodes and the scheduler. The reservation procedure of the system of EP-A-0'393'293 requires operations on the information during transmission which may introduce some undesirable delay.

For very high speed networks one should have a signalling procedure which uses the minimum necessary bandwidth and does not unduly delay propagation of information along the transmission path for transmitting, handling, or receiving the signalling information.

It is an object of the invention to devise a signalling method for serial transmission medium networks comprising a scheduler and several nodes attached thereto, which allows on-demand insertion of the signalling information without requiring complete packets or slots, or preassigned channel or transmission capacity for this information. It is a further object to provide a signalling method for such a system which allows the transfer of service demand and service allocation information between several nodes and the scheduler on an individual basis but in compact form and which allows very fast operation.

These objects are achieved by a signalling method and apparatus as defined in claim 1, claim 3, and claim 4.

The invented method has the advantages that node-individual transfer of information from and to several nodes is possible in a single signalling block requiring the minimum necessary bandwidth, and due to the simple signalling structure very fast handling of the signalling information is possible in each node thus avoiding delays.

These and further advantages will be shown in a embodiment of the invention which is described in the following with reference to the drawings.

Following drawings are provided:

FIG. 1 is a schematic representation of the network structure and further shows, in connection with this structure, the path of a reserve and a confirm command;

FIG. 2 represents the basic slot format for data transmission in the network;

FIG. 3 shows details of the header of the slot format of FIG. 2, including a control section with several fields for control information;

FIG. 4 is a block diagram of the node structure provided in the communication system;

FIG. 5 illustrates the sequence of reserve commands, transmission slots, and confirm commands as they leave and enter the scheduler, and the length of a reservation round;

FIG. 6 shows the insertion of signalling information ADUs between two consecutive slots also consisting of ADUs;

FIG. 7 (FIGS. 7A and 7B) shows the circulation of a reserve and confirm command and their modifications due to insertion and removal of signalling information by the nodes;

FIG. 8 shows two counters provided in each node for reserve and confirm counts, and their input and output information;

FIG. 9 shows an example of status modifications of a slot during its circulation around the ring; and FIG. 10 shows buffer insertion circuitry for insertion and removal of signalling information in a pipelined manner with the speed of data transmission on the ring.

DETAILED DESCRIPTION

1) System, Data, and Node Structure

An implementation of the invention is described in the following for a ring communication system whose structure is shown in FIG. 1. The transmission medium is a closed unidirectional ring (11) to which several nodes or stations (13) which are numbered 1 through K are connected; furthermore, a scheduler S (15) is provided. It should be noted here already that the invention can also be used in other communication system configurations such as dual-bus systems or similar systems in which information which started at a scheduler or header station, after sequentially passing several nodes, can be recirculated (retransmitted) to the initial scheduler (header).

The basic data transmission format on the transmission ring is a time slot having e.g. a structure as shown in FIG. 2 and is called a basic slot (17). Each basic slot is a sequence of Atomic Data Units (ADUs). An ADU is the smallest unit of information which is handled as a whole. It may e.g. consist of 32 bits because the data path and logic units in the circuitry used in the system provide for the handling of 32 parallel bits.

The basic slot consists of e.g. 16 sequential ADUs which are arranged as a slot header comprising e.g. 2 ADUs (19, 21), a data payload comprising e.g. 13 ADUs (23), and a trailer consisting of e.g. 1 ADU (25). The header begins with the start delimiter and further contains various control information. The payload just carries the data to be transmitted by the slot. The trailer begins with the end delimiter and carries some further control information.

FIG. 3 shows some more detail of the control information carried in the slot header (first ADU). The first eight bits (27) are the start delimiter, as was already mentioned. Next, three bits (28) indicate the priority to allow the same types of operations and transmissions to be carried out separately for eight different priority classes. Three bits (29) indicate the slot type, i.e. whether the slot is for synchronous information, asynchronous information, etc. The next two 2-bit groups are not used in the present example. One bit (31) indicates whether the slot is RESERVED or GRATIS, a further bit (32) indicates whether the slot is BUSY or FREE (i.e. whether it carries valid data or not). Finally, there are a Monitor/Bus bit; a Synchronous-Transfer bit (33); and two bits for indicating first/middle/last/-single slot position (for frames using several slots). The last eight bits are unused in present case.

The structure of the principal data paths in a node are illustrated in FIG. 4. The node comprises input circuitry 41 and output circuitry 43 connecting it to the incoming and outgoing portions of the transmission ring 11. A control 45 evaluates incoming data and the current status of the node to generate control signals for the various portions of the data paths. Multiplexer (or switching) circuitry 47 selects one of plural data paths for transferring data to the transmission ring.

There are four principal path for the data. A direct path 49 allows to directly transfer incoming data to the output circuitry (e.g. for synchronous data). An insert buffer 51 is provided for temporarily storing arriving data which can be released later to the ring via path 53. Local data of the node which have to be transmitted and may be stored in several transmission (output) buffers can be selected by multiplexer circuitry 55 for transfer to the output multiplexer via path 57. Incoming data which are to be received by the node can be transferred via a path 59 through a demultiplexer (switching means) 61 to several buffers or local units in the node.

2) Transmission Organization and Reservation Technique

FIG. 5 illustrates how slot reservation and slot marking by the scheduler are organized. (Cf. also FIG. 1, right hand portion =A) Reserve and B) Confirm). Initially, the scheduler releases a Reserve command into which each node requiring slots for data transmission can enter its request (reservation). While the Reserve command circulates on the ring, the scheduler transmits Gratis slots which can be used (if free) by any node without previous reservation. When the Reserve command returns to the scheduler, the information is evaluated to determine whether all or only a portion of the slot requests can be granted. When the scheduler has finished its calculation, it releases a Confirm command to inform all nodes how many slots were granted and will be reserved for the requesting nodes. Immediately after the Confirm command, the scheduler starts to mark slots as reserved; the number of reserved slots corresponds to the total number of confirms given in the Confirm command. Each node will know, from the Confirm command, how many of the reserved slots it may use.

Because of the wrap-around effect in rings, the scheduler sees free gratis slots, busy gratis slots, and free reserved slots. All gratis slots (either free or busy) passing the scheduler are marked by the scheduler as reserved as long as reservations are required.

The scheduler maintains a "current length" count CL indicating how many reserved slots have still to be marked in the current round. The current length counter CL is decreased for every slot marked from gratis to reserved. Free reserved slots pass the scheduler without counter decrease. Free reserved slots arriving at the scheduler occur when busy reserved slots become free and only the upstream nodes (between scheduler and the node removing the slots) have confirmed reservations.

Thereafter, the scheduler sends out the next Reserve command. The interval between the issuance of two Reserve commands is called a "round". Rounds may be of different lengths, depending on the transmission demands of the nodes. No transmission capacity is wasted during the Reserve command circulation and during confirm calculation because of the transmission of Gratis slots during that time. Though the issuance of a next Reserve command in present embodiment is immediately after issuance of the necessary number of reserved slots, any other timing of the Reserve commands is of course possible.

3) Reserve/Confirm Command Insertion/Signalling

Signalling, i.e. Reserve command transmission could be done in specific portions of each slot header, as was suggested in various previous systems.

However, another technique is introduced by the present invention. It is explained with reference to FIG. 6. Initially, there is a normal sequence of basic slots, each consisting of several ADUs (as was shown in FIG. 2). When the scheduler wants to issue a Reserve command, it releases a Start flag (Start-of-Reserve SOR) immediately followed by an End flag (End-of-Reserve EOR). These two flags are inserted in the data stream between two successive slots, e.g. between slots i and i+1, as is shown in FIG. 6 (buffer insertion technique). Each node desiring to reserve slots, waits for a SOR flag to come, and inserts its request unit (field) before the EOR flag. Thus, during its circulation, the Reserve command grows until it has accumulated all nodes' requests, cf. FIG. 6. Both flags and also each request unit have exactly the size of one Atomic Data Unit ADU. The different units in a Reserve command can be called SOR-ADU, RES-ADU, and EOR-ADU.

For granting reserved slots to the nodes, the scheduler will issue a Confirm command of exactly the same structure, i.e. having a start flag (SOC-ADU), several confirm units (CON-ADUs), and an end flag (EOC-ADU). Each node having previously made a request removes one confirm unit (ADU) from the Confirm command.

This signalling technique allows immediate insertion of signalling information whenever necessary, without wasting any transmission capacity. It is termed "insert-/remove signalling". Though the signalling technique in present case is used for Reserve and Confirm commands, it can of course be applied for any other type of signalling, such as system reconfiguration, special monitoring, failure recovery, etc.

Details of Reserve command and Confirm command handling and transmission are explained in the sequel with reference to FIG. 7 (7A and 7B). FIG. 7A shows the circulation and growing of one Reserve command. After the scheduler, there are only the Start and End Flag SOR and EOR. Node 1 inserts its request (RES1) between the two flags, i.e. a "10". Node 2 which does not require transmission forewards the Reserve command unchanged. Node 3 inserts its request (RES3) for 23 slots between the last request unit and the End flag. Finally, a node i inserts its request (RESi) for 17 slots, and the scheduler receives the request train as shown in the bottom of FIG. 7A. The scheduler knows how many slots each node has requested, and can determine the slots to be granted in the respective round.

The scheduler then issues a Confirm command which has the same structure and the same number of fields as the received Reserve command: A start flag SOC, followed by several confirm units CON1, CON3, CONi, and an End flag EOC. Each confirm unit carries the count of slots granted (confirmed) to the respective node. Each node which previously made a request now extracts the first confirm unit from the command and stores the respective number (i.e. a 10 in node 1, a 20 in node 3, and a 15 in node i) and eliminates the respective confirm field from the command. The command diminishes during its circulation until only the Start and End flag return to the scheduler which will eliminate them.

This procedure allows a node-individual handling of requests and grants, without the necessity for the scheduler to identify the nodes involved. Thus, a fine tuning of traffic/grants and a fair handling of all nodes is possible.

This technique requires the minimum possible transmission capacity for the transfer of signalling information. No separate signalling channel needs to be available. Only upon demand, the required information is inserted in the normal data stream at convenient points, e.g. between two slots.

An important fact is that all information transferred on the medium consists of equal basic units, i.e. ADUs, and that signalling information inserted or removed also consists of one or plural ADUs such that the basic data handling operations in the nodes such as serial-parallel conversions etc., which operate on ADUs, can be continued without interruption for processing the inserted signalling information.

It should be noted also that this type of signalling requires the use of an insert buffer path in each node. If the insert/remove signalling technique is to be used in a communication system which is designed to operate without buffer insertion for normal data transmissions, a single-ADU insert buffer path must be provided for signalling information, as will be explained later with reference to FIG. 10.

With such single-ADU insert/remove circuitry, it is possible to insert and remove signalling information in the data stream not only on slot borders as described above, but between any two successive atomic data units ADU, even in the middle of a slot.

Rules for ADU insertion and remove operations in the reservation/confirmation process 1) Scheduler sends Reserve command The issued Reserve command consists initially only of two ADUs (start flag ADU, and end-flag ADU). When they are inserted, two ADU's of the data stream must be stored (delayed) in an insertion buffer of the scheduler. From now on, the data path in the scheduler becomes longer by two ADUs until that buffer is emptied again.

2) Reserve command arrives at a node

Every node having requests will insert its reservation ADU, requiring that one ADU from the data stream must be stored (delayed) in an insertion register of the node. Now, all data is delayed in that node by one ADU until the insertion register is emptied again.

3) Reserve command returns to scheduler

The scheduler receives the Reserve command and can eliminate from its delay buffer two ADUs (caused by Start/End). All other Reservation ADUs travel further on the medium as idle ADUs (causing a temporary gap).

4) Scheduler issues the Confirm command

After processing of the Reserve command, which may take a time corresponding to several slots, the scheduler inserts the Confirm command, delaying incoming slot ADUs correspondingly in its insertion buffer. Apart from Start flag and End flag ADU, the amount of ADUs is the same as the gap of idle ADUs currently on the medium.

5) Confirm command arrives at a node

Every node which previously made a request removes its confirmation-ADU and empties also its insertion buffer.

6) Gap of idle ADUs returns to scheduler

When the gap of idle ADUs (remainder of the circulated Reserve command) returns to the scheduler the corresponding number of ADUs contained in the insertion buffer (because of inserting the Confirm command) can be removed.

7) Confirm command arrives at Scheduler

Finally, when the Confirm command returns to the scheduler it consists now only of two ADUs (Start and End), so that now the last two ADUs in the insertion buffer of the scheduler can be removed. From this moment on, all ADU delays on the medium caused by the reservation process are eliminated.

4) Count Values and Confirmation Computation

FIG. 8 shows two counters which are provided in each node. There is a first counter 65 for a number NW, representing the number of slots which are waiting for transmission. Whenever there is a request in the node for transmission of a packet or message consisting of M slots, the respective number M is added to the contents of this counter. Whenever local data are transmitted in a slot, number NW is decreased by one. This number NW is inserted as reserve count NR into the next passing Reserve command.

There is a second counter 67 for a number NC representing the number of confirmed slots. Whenever the active node receives a confirm field with a Confirm command (i.e. after it had made a reservation request), the number will be stored as NC in this counter. When the node makes a transmission in a reserved slot, it decreases the number NC by one unit. When a zero is stored in this counter, the node must not use any more reserved slots.

Computation of Confirm Numbers

Input data for this process are the reserve counts NR and a threshold value H. This threshold can be a fixed value or a value which is adapted in response to current traffic situations. It determines the maximum number of reserved slots that may be granted (confirmed) by the scheduler in a single round.

According to any algorithm which is previously selected (but which is not relevant to present invention), the scheduler determines how many slots can be granted (confirmed) to each requesting node, without exceeding the threshold.

Present signalling method which enables node-individual request and confirm data to be carried from nodes to the scheduler and vice versa, allows to apply any suitable computation method for the confirmation.

In present example, a threshold H=45 slots is assumed. The total number of slots requested was 50 (10+23+17 slots, cf. FIG. 7); thus, not all requested slots can be granted. A reduction is made for nodes 3 and i. This results in confirmation numbers of 10, 20, and 15, respectively.

5) Circulation of a Slot on the Ring and Possible Conversions

Each individual slot, when travelling around the ring, can assume several states and can be converted many times. This is basically illustrated in FIG. 9 which shows a ring with a scheduler and six nodes N1...N6. Starting at a point marked by an asterisk, a free and gratis slot arrives at node N1. This has data to transmit and will use that slot, converting it to busy but leaving the gratis indication. When the slot passes the scheduler, it must be left busy (assuming the data it carries are destined for node N2 further downstream), but the scheduler, which still has to issue reserved slots for the current round, converts the slot to reserved (for later use by a node which had previously made a reservation which was confirmed). When the slot arrives at N2, data have reached their destination and the slot can be set free, but the reserved status will be kept. Thus, a free but reserved slot arrives at N3 which is assumed to have data for transmission and to have still a confirmed slot number. When N3 uses the slot by entering its data, it converts the indications to busy and to gratis (because the confirmed reservation now has been served). Assuming the data were destined for N4, this node will receive them and set the slot to free (gratis remains). Then any node further downstream, e.g. node N5, can use it for transmission of data, setting the indicators to busy but leaving the slot gratis. When the data then reach their destination, e.g. at N6, the slot can again be converted to free and will also remain gratis.

This history of a slot shows that during a single circulation, one slot may carry independent data several times, e.g. from three sources to three destinations, despite the fact that it was reserved only for one of these transmissions.

6) Timing of Pipelined Operations in Node Circuitry

To achieve the very high operation speeds which are possible with the signalling method of present invention, a pipelined technique is suggested for ADU insertion and removal in the transfer path of each node. A block diagram of the respective circuitry is shown in FIG. 10.

All data paths and registers in the circuitry of FIG. 10 have the width of one ADU, i.e. they can transfer or store 32 parallel bits (any other width of an ADU is of course possible). There is an incoming bus 71 and an outgoing bus 73. Three clocked registers are provided: An input register R1 (75), an insert buffer register R2 (77), and an output register R3 (79). Furthermore, there are provided three switches S1 (81), S2 (83), and S3 (85). An ADU Insert/Remove FSM (Finite State Machine) 87, i.e. a control unit is provided for generating control signals for these switches on lines 81A, 83A, and 85A, respectively.

There are three internal busses interconnecting the registers and switches: Bus 89 connects the output of R1 to the input of R2, to switch S3, and to the FSM 87. Bus 91 connects the output of R2 to switch S2, and to a Bus 93 for removing ADUs that were stored in the insert buffer. Bus 95 is provided for transferring locally prepared ADUs from the node's transmit registers to switch S2. Bus 97 interconnects switches S2 and S3.

Insert/remove control lines 99 carry two control signals from the node controller to the FSM 87: "Insert" is activated when an ADU is to be transferred from the node to output register R3 while simultaneously an arriving ADU is to be transferred from R1 into insert buffer register R3. "Remove" is activated when an ADU is to be removed from the insert buffer register R2 (while another ADU is transferred from input register R1 to output register R3). FSM 87 also receives each ADU that is shifted out of input register R1 for extracting control information.

Two clocks with alternating clock pulses are provided on lines 101A and 101B respectively: A shift clock (101A) which is directly furnished to registers R1 and R3, and indirectly through switch S1 to register R3. Thus, the input and output registers are clocked in every period, whereas the insert buffer register is only clocked on demand. A switch clock (101B) is furnished to the FSM 87 which will change the switch settings (in the middle between shift clocks) in dependence of the insert/remove control signals (and the contents of the ADU just received on bus 89).

Operation of this circuitry is illustrated in the following Tables 1 and 2. Table 1 shows the insert operation: An ADU sequence a-b-c-d-(e-f) arrives at the node, and one ADU x is inserted between b and c so that a sequence a-b-x-c-d-(e-f) will leave the node. Table 2 shows the remove operation: An ADU sequence a-b-x-c-d-(e) arrives at the node, and the ADU x is removed so that the sequence a-b-c-d-(e) leaves the node. The tables show the settings of all three switches and the contents of all three registers after each shift or switch clock pulse, respectively.

TABLE 1

| CLOCK | S1 | S2 | S3 | R1 | R2 | R3 |
|---|---|---|---|---|---|---|
| SHIFT | −u | u | u | b | / | a |
| SWITCH | u | u | u | | | |
| SHIFT | | | | c | b | b |
| SWITCH | u | −u | −u | | | |
| SHIFT | | | | d | c | x |
| SWITCH | u | u | −u | | | |
| SHIFT | | | | e | d | c |
| SHIFT | u | u | −u | f | e | d |

TABLE 2

| CLOCK | S1 | S2 | S3 | R1 | R2 | R3 |
|---|---|---|---|---|---|---|
| SHIFT | u | u | −u | x | b | a |
| SHIFT | u | u | −u | c | x | b |
| SWITCH | −u | u | u | | | |
| SHIFT | | | | d | x | c |
| SHIFT | −u | u | u | e | x | d |

These tables are self-explaining. They demonstrate that all direct transfer operations as well as insertion and removal of atomic data units can be achieved with the speed of the data transmission on the lines.

This circuitry allows the insertion and removal of signalling ADUs anywhere in the data stream between two ADUs transmitting data. Due to the separate ADU insertion/removal control, the main data flow and its speed are not impeded by insertion and removal of signalling ADUs.

It should be noted that if such pipelined circuitry is to be used not only for single-ADU insertion and removal, but for normal buffer insertion in which several ADU's (e.g. one or more complete slots) are to be delayed, register R2 has to be a multiple-ADU register (storing e.g. 32 or 128 ADUs).

7) Alternatives

In the above description, one specific and preferred embodiment was disclosed. For some of the features, alternative solutions or applications are possible:

7a) Other locations for inserting signalling information

In the example of FIG. 6, the signalling information was inserted at the border between two slots. It is possible, however, (as was mentioned above already) to provide for the insertion of signalling information between any two ADUs, i.e. within any slot. Because of the provision of a specific start and end delimiter "framing" the variable-length signalling information, the nodes and scheduler can suspend operations for handling the slot in transmission, and resume it after the end of the inserted signalling ADU group. The signalling ADUs will be taken from, or directed into, special signalling buffers.

7b) Using Insert/Removal Principle for other Types of Signalling Information

Insert-and-remove signalling was described for the transfer of reserve and confirm information to regulate access to slots. Other types of control information can of course also be transmitted in this manner, and a distinction can be made by the contents of the start delimiter. Examples would be control information for the set-up of synchronous connections between nodes; monitor operations; failure recovery; congestion control; etc.

We claim:

1. In a serial communications network having a transmission medium, a scheduler coupled to the transmission medium and at least one node means coupled to the transmission medium, apparatus in said at least one node means for inserting and removing signalling information in a stream of basic data units (ADU), including
control means (87) for controlling insertion and removal of individual basic data units (ADU) in response to a local insert/remove control signal and a currently received basic data unit, and
clocked register means (75, 77, 79; 101A, 101B) for passing data units through said inserting and removing means in a pipelined manner, maintaining the speed and timing of basic data units in said stream of basic data units despite insertion and removal operations.

2. Method for requesting and allocating a given type of service in a communication system comprising a transmission medium on which data is being transmitted sequentially in time slots, a scheduler and a plurality of nodes connected to the transmission medium,
the method comprising the steps of:
releasing of a request command start flag by the scheduler, followed by an end flag, by inserting them between two time slots in the data stream,
inserting by each node demanding said given type of service, at least one request unit before the end flag,
in the scheduler:
receiving a sequence of request units between said request command start flag and end flag,
evaluating the information to determine the service which can be granted for each individual request received,
transmitting an allocation command by inserting between two slots, a start flag followed by a number of allocation units equal to the number of received request units and arranged in a similar order as the received request units followed by an end flag, each said allocation unit containing an individual allocation information, and
in each node having previously inserted a request, removing the first allocation unit after the allocation command start flag, and receiving its contents which are subsequently used to communicate with other nodes in the communication system.

3. Method according to claim 2 wherein
each said time slot consists of a sequence of fixed-length basic data units (ADU), and
each said start flag and end flag and each said request unit and allocation unit has the form of a fixed-length basic data unit.

4. Method according to claim 2, wherein said request command is a reserve command for requesting the reservation of time slots by said nodes, and each request unit represents a number of slots to be reserved for the respective node, and wherein said allocation command is a confirm command for granting slots to nodes, and each said allocation unit represents a number of slots which are confirmed to be reserved for the respective node.

5. Method according to claim 3, comprising execution of the following steps in the scheduler:
for each transmission of a basic data unit in a request or allocation command, introducing a delay of one additional basic data unit in a delay buffer;
when a request command is received back, removing its start flag and its end flag from the transmission medium, but letting the request units propagate further on the transmission medium as a sequence of idle basic data units,
when the remainder of an allocation command is received, removing its start flag and its end flag from the transmission medium, and
when the sequence of idle basic data units caused by the request command returns, removing it from the transmission medium;
each such removal causing also the extraction of one delayed basic data unit from the delay buffer and a corresponding decrease of delay of a passing stream of basic data units.

6. In a serial communications network having a transmission medium, a scheduler coupled to the transmission medium and a plurality of nodes coupled to said transmission medium, a method to transmit signalling information comprising the steps of:
(a) at the scheduler, preparing and inserting at selected points of a data stream on said transmission medium a start delimiter and an ending delimiter representative of a first type of signalling information;

(b) for each node wanting services identified by the first type of signalling information, inserting, in sequential order, between said start delimiter and said end delimiter a second type of signalling information;

(c) receiving, in said scheduler, the start delimiter followed by one or more of the second type of signalling information and the end delimiter;

(d) evaluating, in said scheduler, the one or more of the second type of signalling information;

(e) preparing, in said scheduler, one or more response signalling information units responsive to the one or more second type of signalling information;

(f) inserting, by said scheduler, at selected points of a data stream the one or more response signalling information units bracketed by a start response signalling delimiter and an end response signalling delimiter, with the one or more response signalling information units being arranged in the same order as the one or more second type of signalling information; and (g) in each node having previously inserted one of the second type of signalling information, removing a response signalling information unit from the response signalling information units.

7. The method of claim 6 further including the step of each node removing the response signalling information unit using said response signalling information unit to exchange information between said each node and others on said network.

8. The method of claim 6 further including the step of said scheduler removing the start delimiter and the end delimiter inserted in step (a).

9. The method of claim 6 further including the step of said scheduler removing the start response signalling delimiter and the end response signalling delimiter inserted in step (f).

* * * * *